United States Patent
Jamil et al.

(10) Patent No.: US 8,990,505 B1
(45) Date of Patent: Mar. 24, 2015

(54) CACHE MEMORY BANK SELECTION

(75) Inventors: Sujat Jamil, Gilbert, AZ (US); R. Frank O'Bleness, Tempe, AZ (US); David E. Miner, Chandler, AZ (US); Joseph Delgross, Chandler, AZ (US); Tom Hameenanttila, Phoenix, AZ (US)

(73) Assignee: Marvell International Ltd. (BM)

( * ) Notice: Subject to any disclaimer, the term of this patent is extended or adjusted under 35 U.S.C. 154(b) by 1949 days.

(21) Appl. No.: 12/235,251

(22) Filed: Sep. 22, 2008

Related U.S. Application Data

(60) Provisional application No. 60/974,306, filed on Sep. 21, 2007, provisional application No. 61/046,323, filed on Apr. 18, 2008.

(51) Int. Cl.
*G06F 12/08* (2006.01)

(52) U.S. Cl.
USPC .................................. 711/128; 711/E12.018

(58) Field of Classification Search
CPC ............ G06F 12/0864; G06F 12/0846; G06F 17/30097
See application file for complete search history.

(56) References Cited

U.S. PATENT DOCUMENTS

| | | | |
|---|---|---|---|
| 5,377,340 A | 12/1994 | Seroussi et al. | |
| 5,379,393 A | 1/1995 | Yang | |
| 6,247,094 B1 | 6/2001 | Kumar et al. | |
| 6,567,817 B1 | 5/2003 | VanLeer | |
| 7,051,184 B2 | 5/2006 | Lane | |
| 7,100,001 B2 | 8/2006 | Edirisooriya et al. | |
| 7,404,043 B2 | 7/2008 | Edirisooriya et al. | |
| 2002/0116567 A1* | 8/2002 | Vondran, Jr. ..................... | 711/3 |
| 2005/0132140 A1* | 6/2005 | Burger et al. ................. | 711/128 |
| 2006/0143400 A1* | 6/2006 | Steely, Jr. ...................... | 711/136 |
| 2007/0234005 A1* | 10/2007 | Erlingsson et al. ........... | 711/216 |
| 2009/0006718 A1* | 1/2009 | Blumrich et al. ............. | 711/103 |

* cited by examiner

*Primary Examiner* — Charles Rones
*Assistant Examiner* — Ryan Dare

(57) ABSTRACT

Devices, systems, methods, and other embodiments associated with a cache memory are described. In one embodiment, a cache tag array includes tag banks. The cache memory further includes a bank selector configured to receive an address and to apply a hash function that maps the address to one of the tag banks.

34 Claims, 11 Drawing Sheets

CACHE MEMORY BANK SELECTION

CROSS REFERENCE TO RELATED APPLICATIONS

This application claims the benefit of U.S. provisional application Ser. No. 60/974,306 filed on Sep. 21, 2007 and U.S. provisional application Ser. No. 61/046,323 filed on Apr. 18, 2008, the contents of which are both incorporated by reference in their entirety.

BACKGROUND

As processor performance has improved, memory systems that provide instructions and/or data to a processor have not achieved similar performance increases. One reason is that the clock speed of a processor can be increased at a greater rate than the clock speed of the memory systems. Memory systems are limited by external busses that supply instructions and data to the processor from external memory, which takes time. As a result, the processor may be idle while waiting for data. To improve processor performance, cache memories have been used to store local copies of data (e.g. within the processor or within the same chip) that may be accessed more quickly than data in an external memory.

A cache memory can improve processor performance for two reasons. First, an address recently accessed will likely be accessed again, so storing the data in a cache memory will make it likely that the data associated with the address is available upon subsequent accesses to the same memory location. Second, data located in memory near a currently accessed data will likely be requested soon after the currently accessed data. Performance can be improved by retrieving the currently accessed data as well as nearby data and storing them both in the cache memory. Later, when data near the previously accessed data is needed, the data will already be available from the cache memory.

Cache memory is typically partitioned into banks (or blocks) and addresses of a memory space are mapped onto the cache banks. When an address maps to more than one bank, to save time all the banks are speculatively accessed to return data that may or may not correspond to the address. The extra speculative accesses consume additional power and resources. When the correct bank has been determined, only the correct data is forwarded to the requesting device and the work performed by accessing the wrong banks is discarded.

A cache is smaller than main memory and will fill up as data is stored into the cache memory. When a cache memory is full, a decision must be made as to which cache data will be removed and replaced with new data. Various replacement methods are history based, for example, Least Recently Used, Not Recently Used, First in First Out). Pseudo random methods have also been used to select data to be replaced based on a combination of variables. However, these methods are non-deterministic and an address may be in one bank at one time and in a different bank at a different time. Thus multiple wrong accesses to tag banks are made before a cache hit or miss can be determined. A more efficient cache memory may be desired.

SUMMARY

An example embodiment includes a cache memory. The cache memory is comprised of a cache tag array including of a plurality of tag banks. The cache memory further includes a bank selector configured to receive an address and to apply a hash function that maps the address to one of the plurality of tag banks.

In one embodiment, the plurality of tag banks includes a first tag bank and a second tag bank. The bank selector is configured to map a different number of addresses to the first tag bank than the second tag bank.

In another embodiment, the hash function is configured to non-uniformly distribute a memory address space to the plurality of tag banks.

In one embodiment, when the number of cache memory accesses of a first address crosses a threshold value, the hash function is configured to map the first address to a first cache location. The first cache location may not have other memory addresses mapped to the first cache location. Without other addresses mapped the first cache location, a cache hit is assured on the first cache location after the first cache location has been filled.

In another embodiment, the hash function is configured to map a first address that has been accessed/requested from the cache memory more than a first number of times within a fixed time period to a first set of cache locations. The hash function is further configured to map a second address that has not been accessed/requested from the cache memory more than the first number of times within the fixed time period to a second set of cache locations. The first and second sets of locations are different cache locations. In one embodiment, the accesses and/or requests come from a processor or other device.

In one embodiment, the bank selector is configured to reassign each memory address accessed more than a first number of times within a fixed time period to another cache location. Only one address is assigned to the cache location of each reassigned address.

In one embodiment, a cache memory includes an activity logic. The activity logic is configured to monitor an access frequency for one or more addresses. The bank selector is responsive to the activity logic to dynamically reassign addresses accessed above a threshold value to cache locations. In one embodiment, the threshold value is an access to the same memory address within a window of cache memory accesses.

In another embodiment, the hash function is programmable.

In another embodiment, the cache memory further includes a hit logic. The hit logic is configured to determine if a tag bank has valid data corresponding to the received address.

In one embodiment, the plurality of tag banks includes a first tag bank. The cache memory further includes a fill logic configured to fill a cache line within the first tag bank upon determining that the first tag bank does not contain valid data corresponding to the received address.

In some embodiments, the bank selector is configured to be dynamically reconfigurable.

In one embodiment, the bank selector is operative to separate the received address into a tag field, an index field, and an offset field. The bank selector is operative to use a portion of the tag field to map the address.

In another embodiment, the bank selector may be configured to map addresses using two bits from the tag field.

In one embodiment, the bank selector may be configured to map a physical address, a virtual address, or a segmented address.

In one embodiment, the cache memory further includes a data array corresponding to the cache tag array.

In another embodiment, the cache memory is a multi-way cache.

In one embodiment, the cache memory is within a chip.

In another embodiment, the cache memory may be operably connected to a processor within a chip.

In one embodiment, the cache memory may be implemented in one of a hard disk drive, a digital versatile disc player, a high definition television, a cellular phone, a set top box, a media player, and a Voice over Internet Protocol (VoIP) phone.

Another example embodiment includes a method. The method includes receiving an address belonging to a memory address space. The method further includes selecting a bank by hashing the address with a hash function to determine to which bank of a plurality of banks within a cache memory the address is mapped. The hash function maps the memory address space to the plurality of banks. The method further includes accessing the bank selected by the hashing.

In one embodiment, the method further includes mapping addresses accessing the cache memory more than a first number of times within a time period to a first set of cache locations and mapping addresses accessing the cache memory fewer than the first number of times within a time period to a second set of different cache locations.

In another embodiment, the method further includes determining a rate of cache memory accesses for each of the one or more addresses requested from the cache memory. The method includes determining whether each rate of cache memory accesses crosses a threshold amount. The method further includes dynamically reassigning, each of the one or more addresses with an access amount that crosses the threshold amount to a different cache location to increase a cache memory hit rate.

In one embodiment, the method further includes determining an amount of accesses for a high access address, where the high access address is mapped into a high density bank. The method dynamically reassigns the high access address to a low density bank, upon the amount of accesses of the high access address crossing a threshold amount. The low density bank has a lower density of addresses mapped to the low density bank than the high density bank to improve the cache memory hit rate.

In another embodiment, the method further includes dynamically reconfiguring the hash function.

In some embodiments, the method further includes mapping the memory address space non-uniformly to the plurality of banks.

In one embodiment, the method further includes accessing data pointed to by the received address and retrieving the data from the cache memory.

In another embodiment, the method includes determining if one of the plurality of banks has valid data corresponding to the received address.

In another embodiment, the method includes filling a cache line within the determined bank with data corresponding to the received address, upon determining that the selected bank does not contain valid data corresponding to the received address.

In another example embodiment a cache memory includes a cache tag array comprised of a plurality of tag banks. The cache memory includes a bank selection logic including a hashing function configured to map addresses to the plurality of tag banks in a non-uniform distribution.

In one embodiment, the plurality of tag banks includes a first tag bank and a second tag bank, where the non-uniform distribution maps a different number of addresses to the first tag bank than the second tag bank.

In another embodiment, upon the number of cache memory accesses of a first address crossing a threshold value, the hashing function is configured to map the first address to a first cache location. No other memory addresses may be mapped to the first cache location.

In one embodiment, the cache memory further includes an activity logic configured to monitor cache memory access requests for each of the one or more addresses. The bank selection logic reassigns a first address location when the access requests for the first address location crosses a threshold value to a new cache location.

In another embodiment, the threshold value is a function of a number of accesses to the same memory address.

In some embodiments, the hash function is software programmable.

In another example embodiment a chip comprises a cache memory. The cache memory includes a cache tag array comprised of a plurality of tag banks. The cache memory further includes a data array corresponding to the cache tag array. The cache memory additionally includes a mapping logic including a hashing function configured to map addresses to the plurality of tag banks in a non-uniform distribution. The chip may include a processor operatively coupled to the cache.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
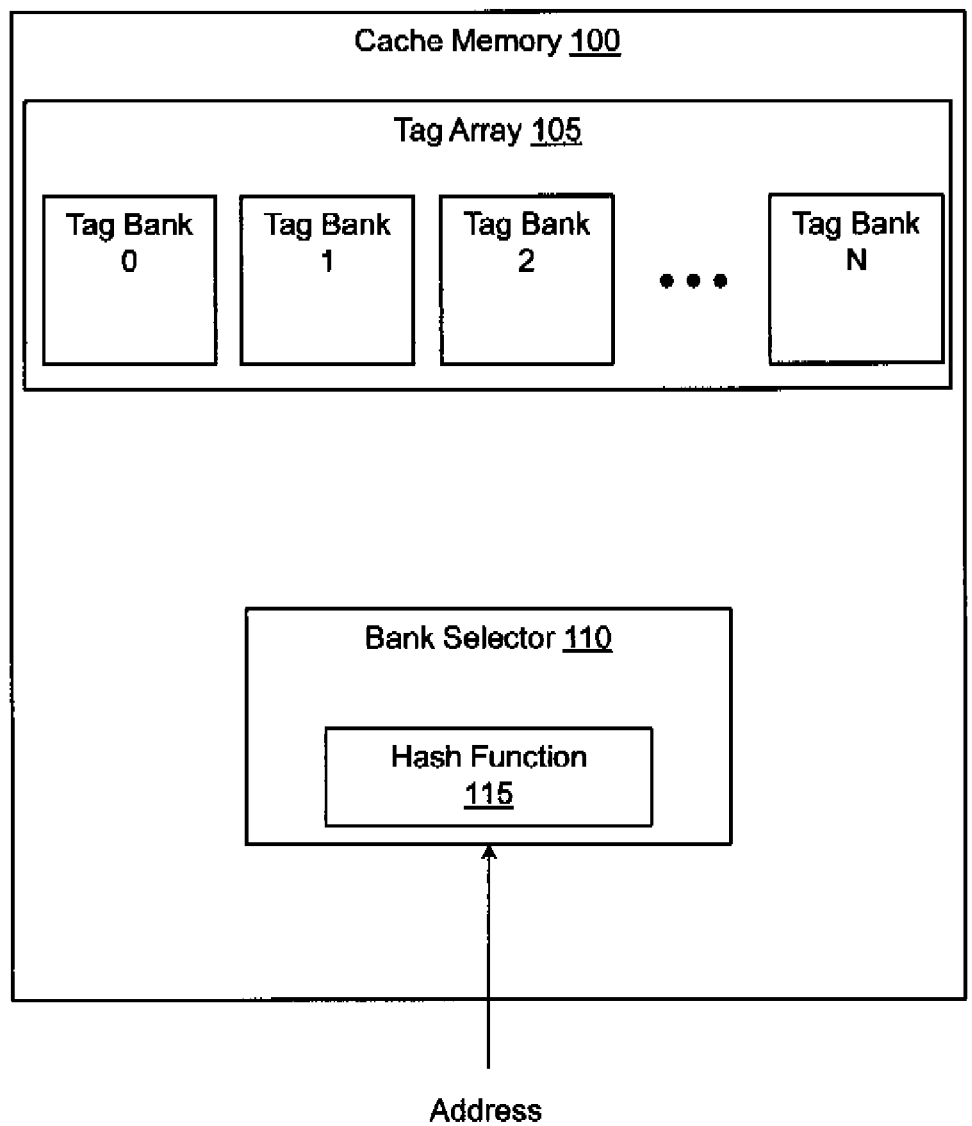
FIG. 1 illustrates one embodiment of a cache memory associated with bank selection.

Described herein are example systems, methods and other embodiments associated with a cache memory. In one embodiment, a cache memory is partitioned into banks that include tag banks for storing addresses and data banks for storing data. A bank selector is configured to apply a hash function that maps an address space onto the tag banks. When an address is received, the bank selector applies the hash function to determine where the address is located (e.g. identify which tag bank). The bank selector will then check the determined bank for valid data. Because the bank selector uses a hash function that controls the address-to-tag bank mapping, the bank selector can more accurately determine where an address will be located with fewer actions.

In another embodiment, the bank selector may apply a hash function that maps addresses to the tag banks in a non-uniform way. A non-uniform mapping may map more addresses to some cache memory tag banks than to other banks. For example, one tag bank can be over-allocated with mapped addresses and another tag bank can be under-allocated. In one embodiment, an over-allocated mapping can include a first tag bank having multiple addresses that share tag locations within the tag bank while a second tag bank can be under-allocated where addresses do not share tag locations with other addresses. In another embodiment, an address that is often requested may be mapped to a tag bank location that has no other addresses mapped to a same tag bank location (e.g. under-allocated tag bank). Addresses that are less often requested are mapped to a tag bank that can have more than one address mapped the same tag bank location (e.g. over-allocated tag bank).

Using a hash function to map frequently used addresses to an under-allocated tag bank increases the probability of those addresses being in the cache memory. Since the tag bank is under-allocated with addresses, the tag bank is less likely to fill up and replace addresses. Therefore, the overall hit rate of the cache memory may be improved. Of course, the hash mapping can under-allocate multiple tag banks if desired.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a programmable logic device, a CD, other optical medium, a RAM, a ROM, a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

With reference to FIG. 1, one embodiment of a cache memory 100 is illustrated. The cache memory 100 may be used with a microprocessor to store data from a slower memory. The cache memory 100 includes a tag array 105 that is partitioned into a plurality of tag banks 0-N. In one embodiment, each tag bank has the same memory size but other arrays are also possible. Each tag bank 0-N includes several tag bank locations for storing memory addresses. It will be appreciated as used herein that a memory address may include but is not limited to a physical address, a virtual address, a segmented address, a portion of an address or any other type of address.

The cache memory 100 further includes a bank selector 110 that determines where an address might be located. The bank selector 110 is configured to receive an address request from a microprocessor and to apply a hash function 115 that maps the address to one of the tag banks 0-N. In one embodiment, the address (or portion of the address) is inputted to the hash function and an output value is produced that identifies the tag bank in which the address resides or will be stored. The identified tag bank is then accessed to determine if the requested address is present or not. Since the hash function 115 controls address mapping such that an address cannot be mapped to multiple tag banks, only one tag bank is accessed in the embodiment. The cache memory 100 performance may be improved because with an address mapped to one tag bank, no other tag banks need to be searched to locate the address.

The address-to-tag bank mapping performed by the hash function 115 is configured to be deterministic. A deterministic address mapping will map the same address to the same tag bank each time the address is mapped. Thus the hash function 115 controls where an address will be placed or found (e.g. in which tag bank). In one embodiment, the hash function 115 may be a binary logic function or other function that uniquely selects one of the tag banks 0-N based on a received address value or portion of the address. The hash function 115 may be chosen to be fair and uniformly distribute an address space over the tag banks 0-N or may be chosen to be biased to over-allocate desired address ranges to some tag banks and to under-allocate other tag banks. The hash function 115 may be a many-to-one mapping function such that many addresses may select the same tag bank.

In other words, the hash function 115 is configured to map addresses where any particular address is not mapped to two or more tag banks. Bank selection by the bank selector 110 is deterministic since the hash function 115 will determine the one tag bank where a requested address should be located. Thus multiple bank accesses can be avoided. This further simplifies the cache memory allocation and replacement functions. Simplifying these functions can save power and energy by reducing the number of actions needed for performing a function. In non-deterministic history-based methods, any particular address can reside in any tag bank, which then needs complex cache accesses including multiple bank accesses, allocations, and/or replacements. Additionally, complex cache accesses may occur in the same, adjacent, or nearby clock cycles and may affect the allocation and replacement functions. Thus in one embodiment, the bank selector 110 provides a hash-based tag bank selection that is not history based so the tag bank selection process has no tag-related dependence. Accordingly, the history of cache accesses can be removed from the address allocation and replacement functions.

With further reference to FIG. 1, when the requested address is not in the identified bank, the cache memory 100 will make a request to an external memory to provide the data pointed to by the address. When the data is received, the cache memory 100 will write the address into the tag bank identified by the hash function 115 and the data is written into a data bank that corresponds to the identified tag bank. Writing the received address to the identified bank and the data to the corresponding data bank simplifies other cache memory logic. For example, the least recently used, first in first out and/or pseudo random algorithms used by other caches to determine which tag bank 0-N to place retrieved data are reduced or eliminated because the received address is placed in the tag bank that is predetermined by the hash function 115. Other components that consume power and may impact the operational speed of the cache memory 100 may be eliminated because the bank selector 110 applies the hash function 115 to map the received address to the same identified bank each time the same address is received.

Configuring the bank selector 110 to apply the hash function 115 can also increase the probability that a requested address is stored in the cache memory 100, thus increasing the cache hit rate. A cache hit occurs when a requested data pointed to by a received address is present in a corresponding data array. A cache miss occurs when the requested data is not stored in the data array. Typically, when a cache miss occurs, there is a delay while the missing data is retrieved from another slower memory. Therefore in one embodiment, the bank selector 110 and the hash function 115 are configured to minimize cache misses by giving priority mapping to more frequently requested addresses.

For example, the hash function 115 is configured to map a different number of addresses to one tag bank than to another tag bank. That is, the hash function 115 may be configured to non-uniformly distribute a memory space to a plurality of tag banks. This will be further described with reference to FIG. 3. For example, consider tag banks one and two that each can hold 1,000 tag addresses. For illustration, consider a hash function 115 configured to map 2,000 addresses to tag bank one and 20,000 addresses to tag bank two. In this example, an addresses mapped to tag bank one would have a higher probability of being in tag bank one than an address mapped to tag bank two because there are fewer addresses that share the same locations in tag bank one than addresses that share locations in tag bank two. With less addresses mapped to the tag bank locations of tag bank one, there is less chance that tag bank one will be filled up and less chance that an address will be removed upon a cache memory miss as compared to tag bank two.

In another embodiment, the bank selector 110 is configured to track a number of cache memory accesses/requests of one or more addresses and detect whether the number of accesses/requests for an address meets/passes a threshold value. In one embodiment, the threshold value may be a function of a number of accesses to a particular address. For example, the threshold can be set at a certain number of accesses to the cache memory 100 by the same address within a certain time period. In one example, the threshold may be ten cache memory accesses to the same address within a one microsecond window. The threshold could be a function based on loads to same address compared to stores to same address. Of course, other functions can be implemented.

For example, cache memory 100 may receive a request to access the data pointed to by an address called ADDRESS-3 more than ten times within the one microsecond window. When the bank selector 110 detects that the threshold value is met or exceeded, the hash function 115 can be reconfigured to map ADDRESS-3 to an under-allocated tag bank. In one embodiment, the address can mapped to a tag bank location that has no other memory addresses mapped to that tag bank location. Thus a cache hit on that cache location is assured after the tag bank location has been filled with the address. In this manner, the hash function 115 is dynamically reprogrammable to modify the address mapping (e.g. reprogram the hash function 115 in response to operating conditions of the cache).

In another embodiment, the threshold value can be based on a number of cache access requests for the same address within a window of cache requests. For example, consider a threshold value of ten accesses to the same address within 1,000 of the most recent cache memory accesses. In this example, if the same address is requested more than ten times within the most recent 1,000 cache access requests, then the threshold value has been crossed.

In another embodiment, the bank selector 110 is configured to be dynamically reconfigurable. For example when the access threshold is met for one or more memory addresses, the bank selector 110 and the hash function 115 are reconfigurable/reprogrammable to reassign the mapping of the one or more memory addresses to another cache location (e.g. remap from one tag bank to another). In one embodiment, the hash function 115 is reprogrammable by being replaced with another hash function to modify the mapping of addresses to the tag array 105. In another embodiment, the hash function 115 is software reprogrammable.

The cache memory 100 and the tag array 105 may be a multi-way cache. For example, the cache 100 can be implemented as a 2-way, 4-way, 8-way, 16-way, 32-way cache, and so on. Of course these are only examples and differing numbers of tag banks 0-N and ways may be configured within the cache memory 100. To explain a "way" and a "set" as used when referring to a cache memory, consider an example cache that has eight tag banks 0-7 and is 2-way set associative. In a 2-way cache, each set will include two banks. Thus the eight bank cache has four sets. Set-0 includes tag banks zero and one, while set-1, set-2, and set-3 include tag banks two and three, four and five, and six and seven, respectively. In one embodiment, the cache memory 100 can be configured with a hash function 115 that maps addresses to one of the four sets. In this embodiment, a set or way is regarded as a bank for mapping purposes. In a direct mapped cache, an address may only be mapped to one bank so the number of banks equals the number of sets. In a fully associative cache, the number of tag banks equals the number of ways.

It will be appreciated that in one embodiment the cache memory 100 is implemented within a chip. In another embodiment, the cache memory 100 is operably connected to a processor within a chip. In other embodiments, the cache memory 100 is implemented or embodied within a device, for example, a hard disk drive, a digital versatile disc player, a high definition television, a cellular phone, a set top box, a media player, a Voice over Internet Protocol (VoIP) phone, and so on.

Figure 2:
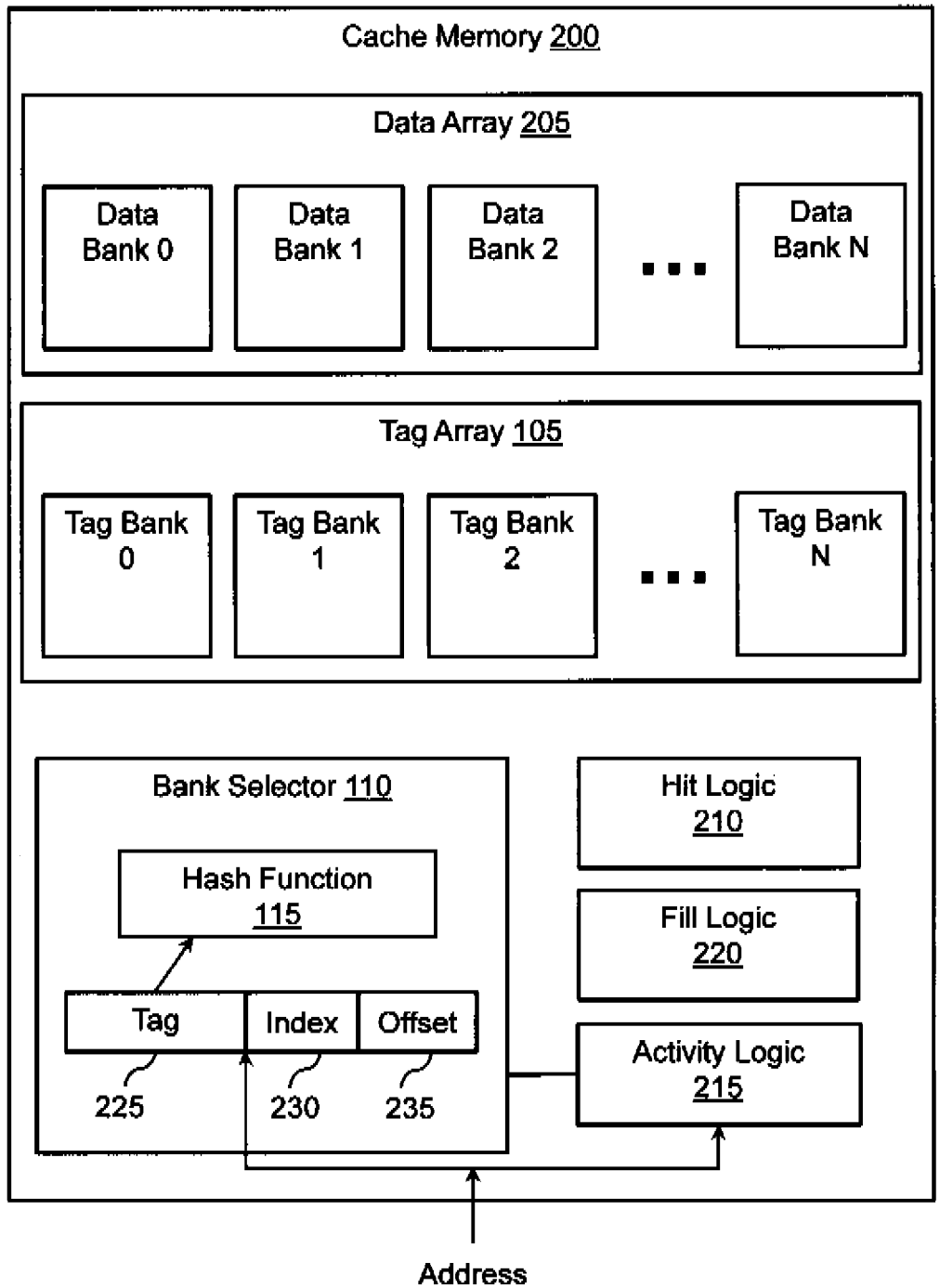
FIG. 2 illustrates another embodiment of cache memory associated with bank selection.

With reference to FIG. 2, an example cache memory 200 is shown that is another embodiment of the cache memory 100. Similar elements from FIG. 1 are shown with the same reference numbers. The cache memory 200 can include a data array 205 comprised of data banks 0-N. In one embodiment, each the data banks 0-N will correspond to one of the tag banks 0-N and will hold lines of data represented by the addresses stored in the tag banks 0-N. In another embodiment, each row of the tag banks 0-N can store one address and each data bank 0-N will have one line of data corresponding to one of the tag bank addresses.

In one embodiment, cache memory 200 includes a hit logic 210. When an address is requested from the cache memory 200, the bank selector 110 and hash function 115 hash the address to identify and select a tag bank as previously described. The hit logic 210 is configured to determine if one of the address locations within the selected tag bank has valid data corresponding to the received address. The hit logic 210 may make this determination by comparing all valid addresses within the selected tag bank to the entire received address. One embodiment may have a valid bit that is set within the selected tag bank when the corresponding line of data within the data array 205 is valid. If the hit logic 210 determines that the selected tag bank contains the received address, the hit logic 210 is configured to retrieve the data from the corresponding data array 205.

In another embodiment, the cache memory 200 may further include an activity logic 215 configured to monitor an access frequency for one or more addresses. The bank selector 110 may be responsive to the activity logic 215 to dynamically reassign addresses accessed above a threshold value to other cache locations so that the hit rate of the cache memory 100 is increased. The threshold value may be any threshold value as discussed above.

In another embodiment, the cache memory 100 may include fill logic 220. When a requested address is received and the hit logic 210 determines that no address within the selected tag bank matches the received address, the fill logic 220 is configured to fill a line within the selected tag bank. If all lines within the selected tag bank are filled, then a line will need to be evicted and replaced with a new line. In another embodiment, when there is a cache miss, the same line that the received address was mapped to within the selected tag bank will be replaced upon a cache miss.

To process a received address request, in one embodiment the bank selector 110 is configured to map the received address by separating or parsing the received address into a tag field 225, an index field 230, and an offset field 235. The bank selector 110 is configured to use a portion of the tag field 225 to map the address to one of the tag banks 0-N. Of course, this operation is based on the manner in which the hash function 115 is programmed. For example, if the hash function 115 is configured to hash a portion of the tag field 225, then that portion is parsed out of the address and used in the hash. If the hash function 115 is configured to hash the entire address, then the entire address is applied to the hash function, and so on. As previously described, the hash function 115 outputs a selected tag bank for an inputted value. The bank selector 110 then maps the address to a line within the selected tag bank. For example, if a tag bank has 64 lines, then the index field 230 will be six bits that represent one of the 64 lines. The right most portion of the address is the offset field 235 and is used to point to data within the cache line pointed to by the index field 230.

In one embodiment, the cache memory 200 is configured with four tag banks 0, 1, 2, and 3. The bank selector 110 is configured to apply two bits of the tag field 225 to the hash function 115 to map the received address to one of the four banks. In one example, the two most significant tag field 225 bits are used. If the address is a 32 bit address (e.g. bits 0-31), then address bits 31 and 30 may be applied by the bank selector 110 to the hash function 115. In one example, when both address lines are low the address would be mapped by the hash function 115 to tag bank 0. When tag bit 31 is low and tag bit 30 is high, the address would be mapped to bank 1. Likewise, when tag bit 31 is high and tag bit 30 is low, the address would map to tag bank 2, and when both tag bits are high, to tag bank 3. Of course, other variations can be implemented.

Figure 3:
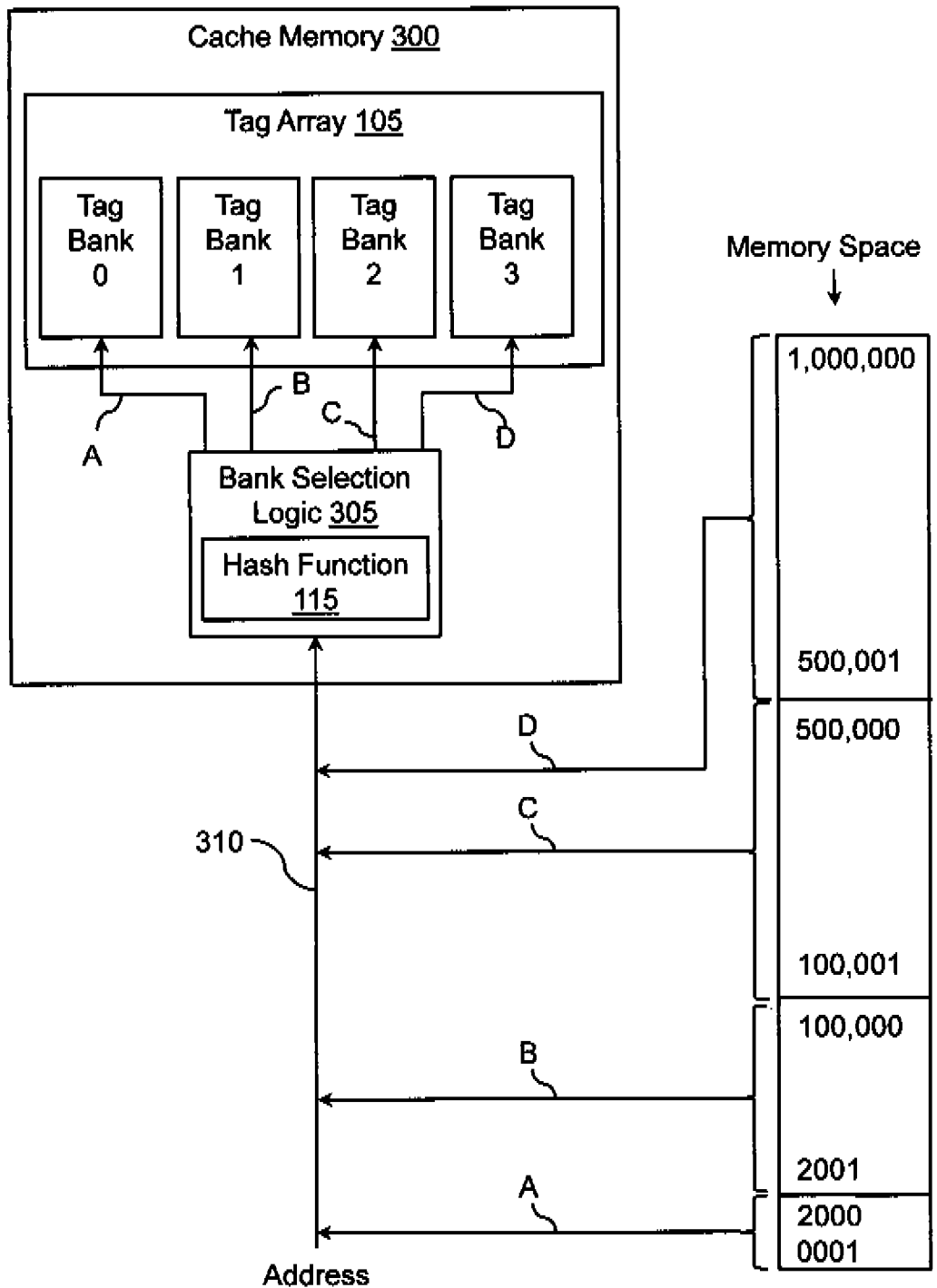
FIG. 3 illustrates another embodiment of cache memory associated with bank selection.

With reference to FIG. 3, another embodiment of a cache memory 300 is illustrated that is configured to map a memory space to tag banks in a non-uniform distribution using the hash function 115. Similar elements from FIGS. 1 and 2 are shown with the same reference numbers. The cache memory 300 includes a tag array 105 with four tag banks 0-3. Of course, other numbers of banks can be implemented. In one embodiment, the tag banks 0-3 are configured and operate like the tag banks 1-N of FIGS. 1 and 2. The cache memory 300 further includes a bank selector logic 305 that applies the hash function 115 of FIG. 1 to map an inputted address 310 to one of the tag banks 0-3. The bank selector logic 305 may be configured similar to the bank selector 110 of FIGS. 1 and 2 and may apply a hash function 115 to map each address of a memory address space to one of the four tag banks 0-3 in a deterministic way.

An example memory space is shown that contains 1,000,000 address locations. The address locations start at address "0001" and stop at address "1,000,000". The addresses are represented in decimal format for ease of explanation. Of course, the address space could alternatively start at other addresses such as address zero and be represented in hexadecimal notation. As indicated by the four bracketed regions of FIG. 3, the memory space is subdivided into four memory regions A, B, C, and D. A first memory region includes 2,000 addresses from 0001 to 2000. A second memory region spans addresses 2001 to 100,000. Third and forth memory regions span addresses 100,001 to 500,000 and addresses 500,001 to 1,000,000, respectively.

In one embodiment each of the four regions may be mapped to one of the tag banks 0-3. For example, the lines labeled "A" show the bank selector logic 305 mapping the first memory region to tag bank 0. Similar sets of lines ("B", "C", and "D") respectively show the second memory region, the third memory region and the forth memory region being mapped to tag bank 1, tag bank 2 and tag bank 3, respectively. For ease of explanation, the four memory regions are continuous portions of the memory space with each illustrated memory region mapped to one of the tag banks 0-3. In other embodiments, different non-continuous portions of a memory region may be mapped.

In one embodiment, each of the four tag banks 0-3 has the same number of storage locations. Consider one example where each tag bank 0-3 has 2,000 storage locations. The hash function 115 is configured to map the addresses of the first memory region to tag bank 0. Because tag bank 0 has 2000 locations and the first memory region has 2000 address locations, all of the first memory region addresses can be stored simultaneously within tag bank 0 so that no tag bank location in tag bank 0 has more than one memory address mapped to the same location. Thus, there is a high probability of a cache hit for address requests for addresses within region "A" because tag bank 0 is not over-allocated with mapped addresses.

The hash function 115 is further configured to map the addresses from memory region "B" to tag bank 1. The second memory region "B" has 98,000 addresses, which is more than the 2,000 address locations in tag bank 1. Thus, the hash function 115 maps these addresses to tag bank 1 in an over-allocated and non-uniformed distribution as compared to tag bank 0. As such, multiple addresses of the second memory region will be mapped to the same tag locations in tag bank 1. Memory regions "C" and "D" are mapped to tag banks 2 and tag bank 3, respectively. Both of these regions include more addresses than the second memory region "B" and include more addresses than a tag bank can contain. Thus tag banks 2 and 3 are more over-allocated than tag bank 1 and accordingly will have a possibly lower hit rate since more addresses are mapped into and share the same tag bank.

Figure 4:
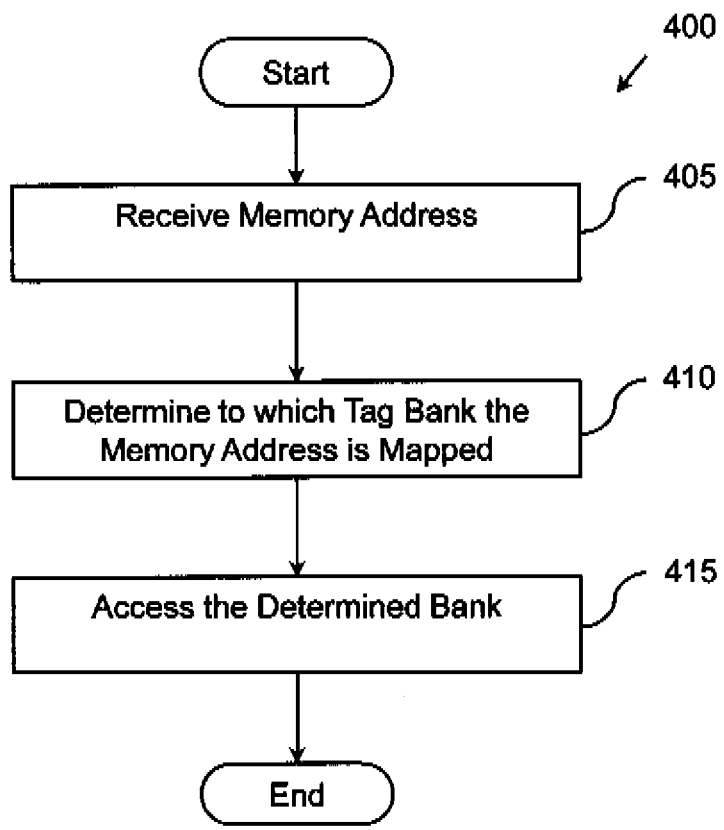
FIG. 4 illustrates one embodiment of a method associated with cache memory bank selection.

FIG. 4 illustrates one embodiment of a method 400 associated with cache memory bank selection. The method is presumed upon a cache configuration as described with reference to FIG. 1 where a hash function is configured to map a memory address space to tag banks in the cache. At block 405, the method begins by receiving a memory address that is requested from the cache. The method continues at block 410 by determining to which tag bank within the cache memory the address is mapped. The determination is made by hashing the address with the hash function and an output of the hash function identifies a tag bank. The identified tag bank is selected and at step 415, the tag bank selected is accessed. As previously described, the hash function provides for a deterministic mapping of addresses and selection of tag banks so that in one embodiment, only one tag bank is accessed to determine a cache hit or miss.

Figure 5:
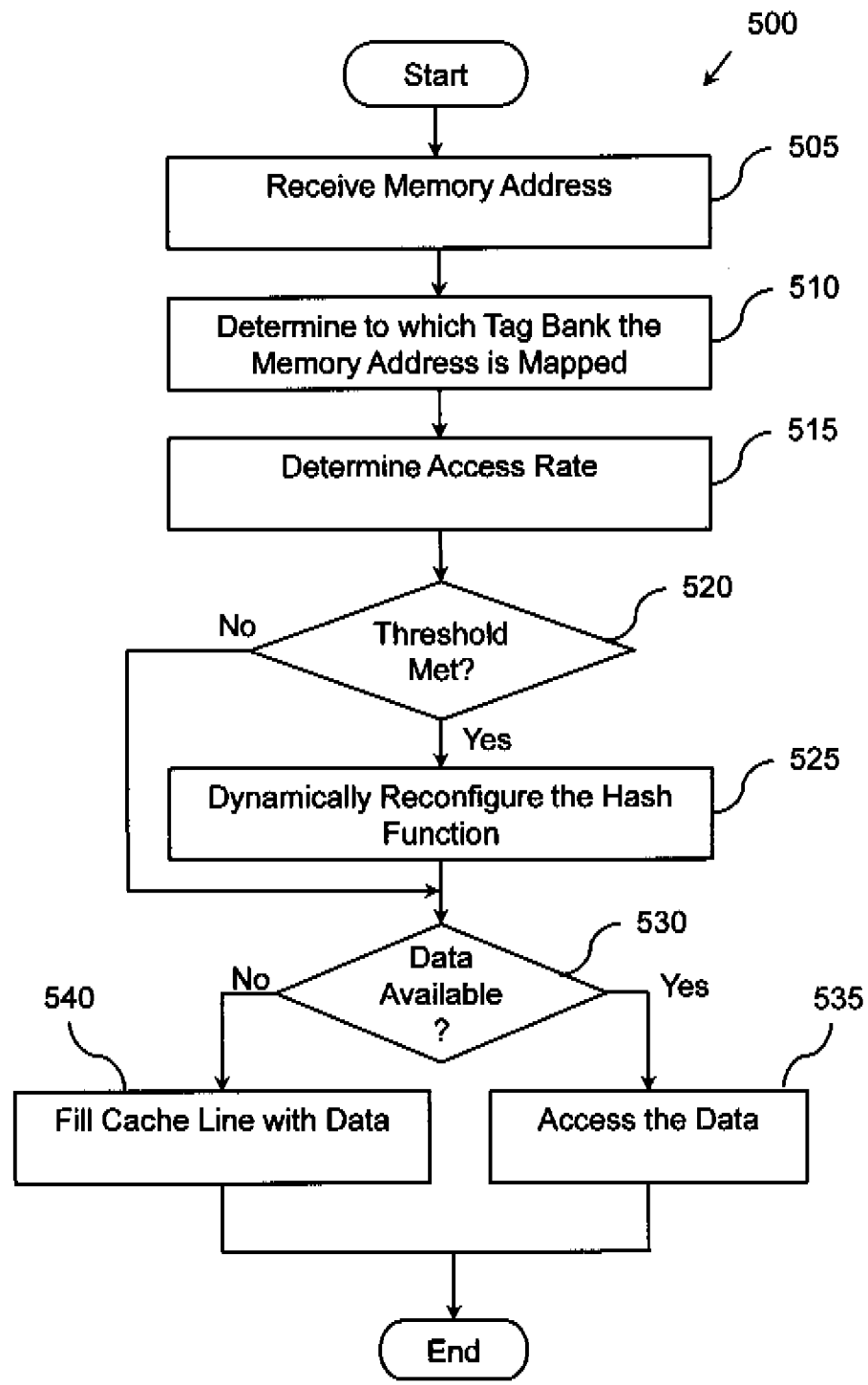
FIG. 5 illustrates another embodiment of a method associated with cache memory bank selection.

FIG. 5 illustrates another embodiment of a method 500 associated with cache memory bank selection. The method 500 begins at block 505 by receiving a memory address from an address request. The method continues at block 510 by determining to which tag bank within a cache memory the address is mapped. The determination is made by hashing the address with a hash function as previously described. At block 515, a rate of cache memory accesses is determined for each of the one or more addresses requested from the cache memory. At block 520, a determination is made as to whether the rate of cache memory accesses for one or more of the address meets/crosses a threshold amount. The rate of access and the threshold amount may be implemented similar to threshold values as discussed above.

At step 525, if the threshold amount was met, the hash function is dynamically reconfigured. In one embodiment, if the mapping is initially uniformly distributed, then the hash function can be reprogrammed to map the memory address space non-uniformly to the tag banks. In another embodiment, each of the one or more addresses with an access amount that crosses the threshold amount can be dynamically reassigned and remapped to different cache locations. The reassigning may increase the cache memory hit rate.

In another embodiment, at block 520, if the amount of accesses for a received address is determined to cross a threshold amount, then at block 525 the address is dynamically reassigned to be mapped to a low density tag bank. The low density bank has a lower density of addresses mapped to it, which may improve the cache hit rate for the address.

At block 530, the method determines whether the selected bank (from block 510) has valid data corresponding to the received address. If the data is available in the cache, the data is accessed and retrieved from the cache memory (block 535). If at 530 it is determined that the selected bank does not contain valid data corresponding to the received address, then at block 540, the data is retrieved and a cache line within the determined bank is filled with the data.

In another embodiment of block 525, the reconfiguring can remap addresses that are requested more than a predetermined threshold (e.g. a number of requests within a time period) to a first set of cache locations. Addresses that are requested fewer than the predetermined threshold are mapped to second set of cache locations. The first and second cache locations may be different cache locations.

Figure 6:
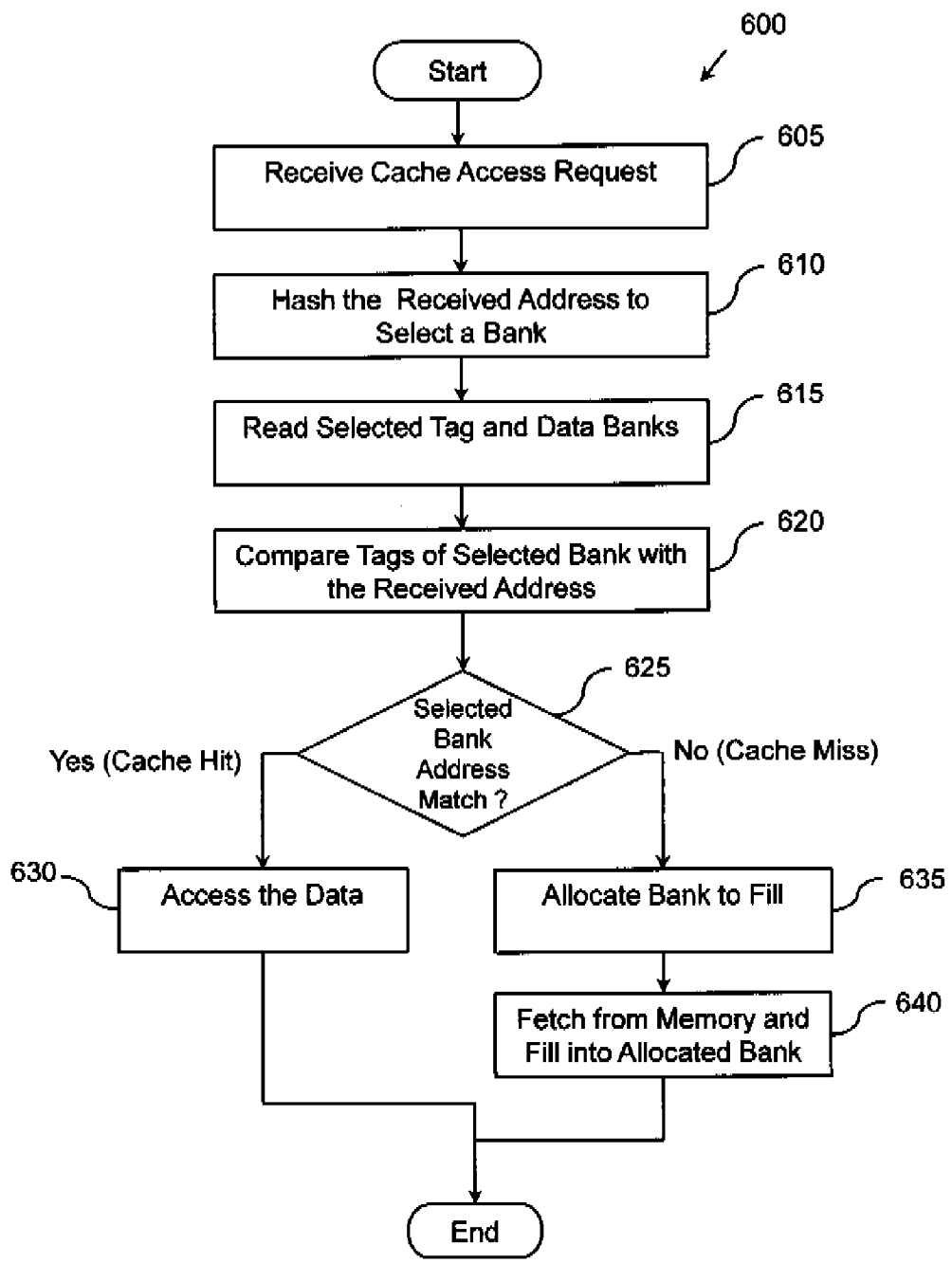
FIG. 6 illustrates another embodiment of a method associated with cache memory bank selection.

FIG. 6 illustrates another embodiment of a method 600 associated with cache memory bank selection. The method 600 begins at block 605 by receiving an address requested from a cache. The received address is hashed to select a tag bank (block 610), which has a corresponding data bank. Next, the selected tag and data banks are read at block 615. At block 620, a comparison is made between the tags of the selected bank and the received address. If the address (e.g. tag) in the selected bank matches the received address at block 625, then there is a match (cache hit) and the flow moves to block 630. The data corresponding to the received address is then accessed from the selected bank. If there was no address match at 625 between the received address and the addresses stored in the selected bank, then the selected bank is allocated to be filled at block 635. At block 640, the data corresponding to the received address is fetched from another memory and filled into the allocated bank.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods can also be implemented with circuits.

Figure 7:
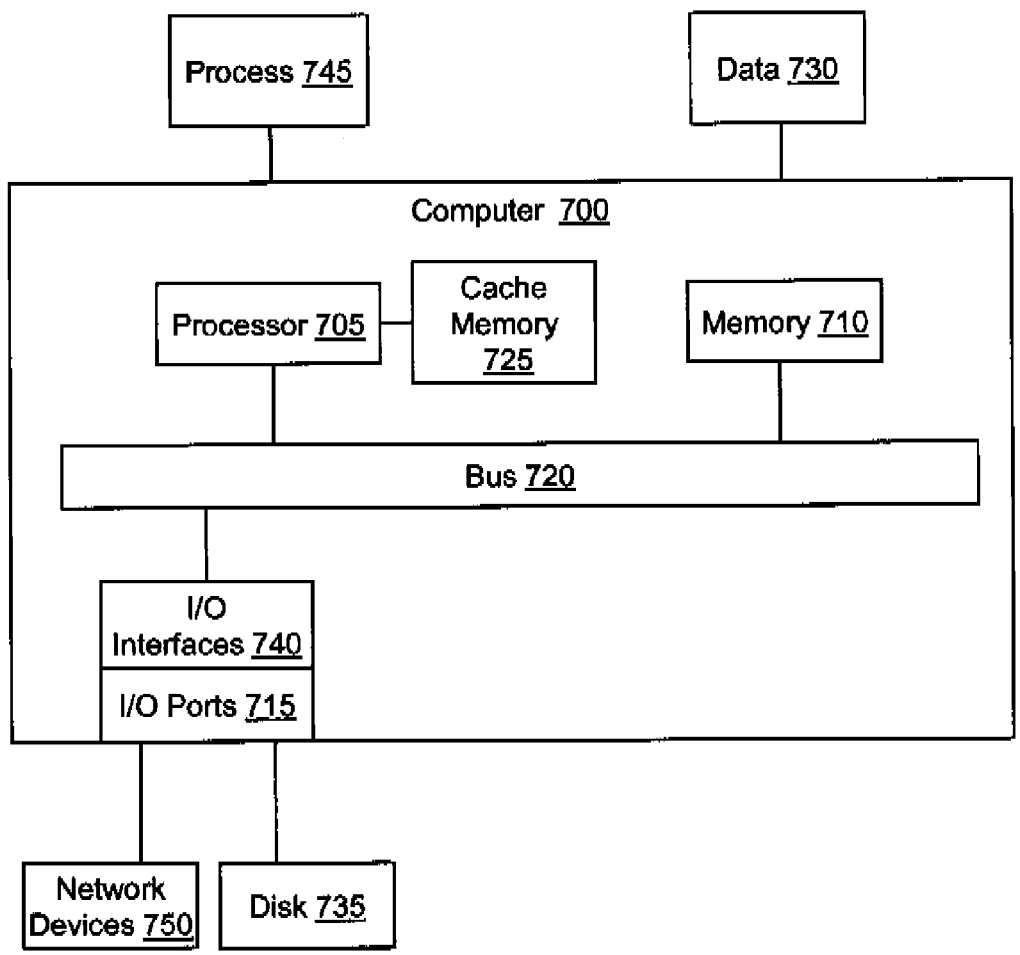
FIG. 7 illustrates one embodiment of a computing environment in which example systems and methods, and equivalents associated cache memory bank selection may be implemented.

FIG. 7 illustrates an example computing device in which example systems and methods described herein, and equivalents, may be implemented. The example computing device may be a computer 700 that includes a processor 705, a memory 710, and input/output ports 715 operably connected by a bus 720. In one example, the computer 700 may include a cache memory 725 configured received an address and to select a cache memory tag bank.

The cache memory 725 provides a means (e.g., hardware, stored software, firmware) for mapping an address space to tag banks within the cache memory 725 and apply an address to a hash function to map the address to one of the tag banks to determine a selected tag bank. The cache memory 725 can be configured similar to the cache memory 100, 200, or 300, and/or combinations of their features.

The cache memory 725 can include logic implemented, for example, as an ASIC or other type of circuit. The logic may also be implemented as computer executable instructions that are stored and processed by a processor.

Generally describing an example configuration of the computer 700, the processor 705 may be a variety of various processors including dual microprocessor and other multi-processor architectures. A memory 710 may include volatile memory and/or non-volatile memory. Non-volatile memory may include, for example, ROM, PROM, EPROM, EEPROM, and so on. Volatile memory may include, for example, RAM, SRAM, DRAM, and so on.

A disk 735 may be operably connected to the computer 700 via, for example, through an input/output interface (e.g., card, device) 740 and the input/output port 715. The disk 735 may be, for example, a magnetic disk drive, a solid state disk drive, a floppy disk drive, a tape drive, a Zip drive, a flash memory card, a memory stick, and so on. Furthermore, the disk 735 may be a CD-ROM drive, a CD-R drive, a C-RW drive, a DVD ROM, and so on. The memory 710 can store a process 745 and/or a data 730, for example. The disk 735 and/or the memory 710 can store an operating system that controls and allocates resources of the computer 700.

The bus 720 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 720 can be types including, for example, a memory bus, a memory controller, a peripheral bus, an external bus, a crossbar switch, and/or a local bus.

The computer 700 may interact with input/output devices via the I/O interfaces 740 including the cache memory 725 and the input/output ports 715. Input/output devices may be, for example, a keyboard, a microphone, a pointing and selection device, cameras, video cards, displays, the disk 735, the network devices 750, and so on. The input/output ports 715 may include, for example, serial ports, parallel ports, and USB ports.

The computer 700 can operate in a network environment and thus may be connected to the network devices 750 via the I/O interfaces 740, and/or the I/O ports 715. Through the network devices 750, the computer 700 may interact with a network. Through the network, the computer 700 may be logically connected to remote computers. Networks with which the computer 700 may interact include, but are not limited to, a LAN, a WLAN, a WAN, and other networks.

FIGS. 8A-8H show different embodiments where the cache memory 100, 200, 300 (of FIG. 1, 2 or 3), the system 700 (of FIG. 7), or combinations and equivalents thereof may be implemented. For example, the cache memory 100, 200, 300 may be implemented in a device shown in FIGS. 8A-8H. In some embodiments, the cache memory 100, 200, 300 may be implemented within a processor or a controller within one of the devices shown in FIGS. 8A-8H. Each of the examples shown in FIGS. 8A-8H may also be in communication with other computer components.

Figure 8A:
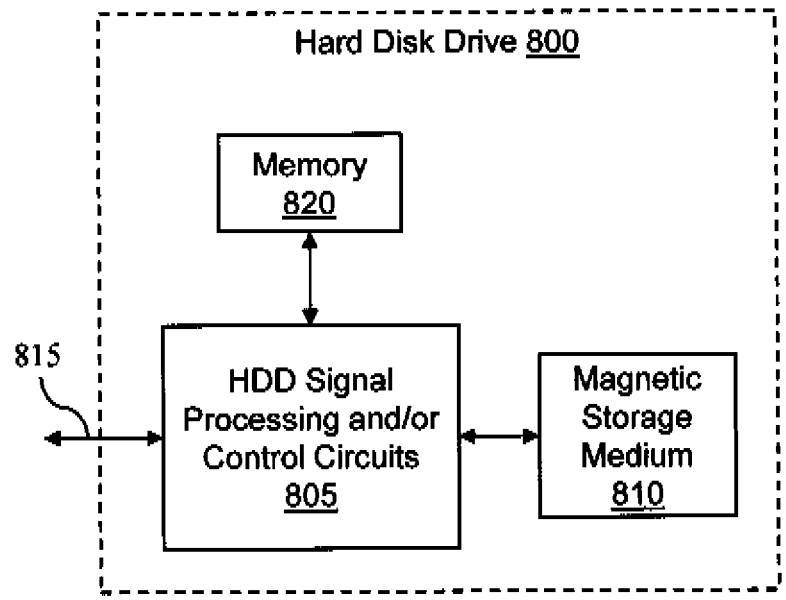
FIGS. 8A-8G illustrate various example embodiments of devices that implement embodiments associated with cache memory bank selection.

Referring to FIG. 8A, one embodiment may be implemented in a hard disk drive (HDD) 800. The HDD 800 may implement either or both signal processing and/or control circuits, which are generally identified in FIG. 8A at 805. In some implementations, the signal processing and/or control circuit 805 and/or other circuits (not shown) in the HDD 800 may process data, perform coding and/or encryption, perform calculations, and/or format data that is output to and/or received from a magnetic storage medium 810. In this exemplary embodiment, the present invention may be implemented in this signal processing and/or control circuitry, but other arrangements are also possible.

The HDD 800 may communicate with a host device (not shown) such as a computer, mobile computing devices such as personal digital assistants, cellular phones, media or MP3 players and the like, and/or other devices via one or more wired or wireless communication links 815. The HDD 800 may be connected to a memory 820, such as random access memory (RAM), a low latency nonvolatile memory such as flash memory, read only memory (ROM) and/or other suitable electronic data storage.

Figure 8B:
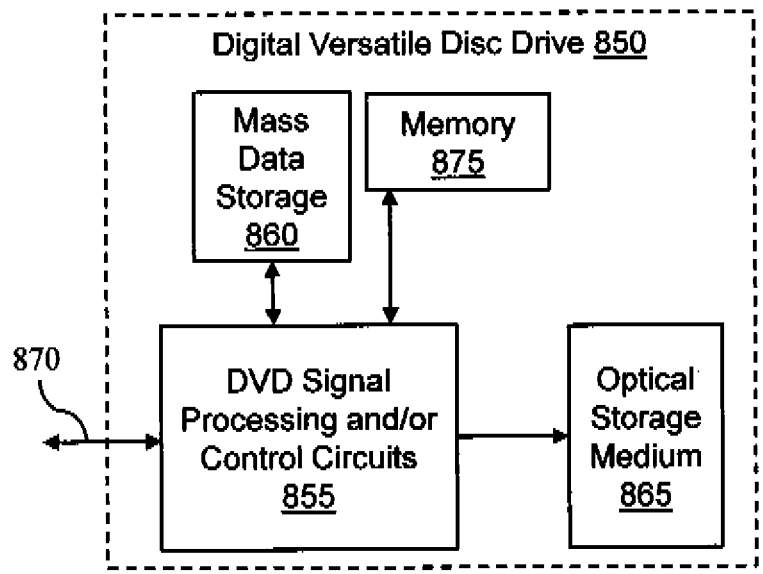

Referring now to FIG. 8B, another embodiment may be implemented in a digital versatile disc (DVD) drive 850. The DVD 850 may implement either or both DVD 850 signal processing and/or control circuits, which are generally identified in FIG. 8B at 855, and/or mass data storage 860 of the DVD drive 850. The DVD signal processing and/or control 855 and/or other circuits (not shown) in DVD drive 850 may process data, perform coding and/or encryption, perform calculations, and/or format data that is read from and/or data written to an optical storage medium 865. In some implementations, the DVD signal processing and/or control circuit 855 and/or other circuits (not shown) in the DVD drive 850 can also perform other functions such as encoding and/or decoding and/or any other signal processing functions associated with a DVD drive. In this exemplary embodiment, the present invention may be implemented in this signal processing and/or control circuitry, but other arrangements are also possible.

The DVD drive 850 may communicate with an output device (not shown) such as a computer, television or other device via one or more wired or wireless communication links 870. The DVD drive 850 may communicate with mass data storage 860 that stores data in a nonvolatile manner. The mass data storage 860 may include a hard disk drive (HOD) as shown in FIG. 8A. The HDD may be a mini HDD that includes one or more platters having a diameter that is smaller than approximately 1.8 inches. The DVD drive 850 may be connected to a memory 875, such as RAM, ROM, low latency nonvolatile memory such as flash memory, and/or other suitable electronic data storage.

Figure 8C:
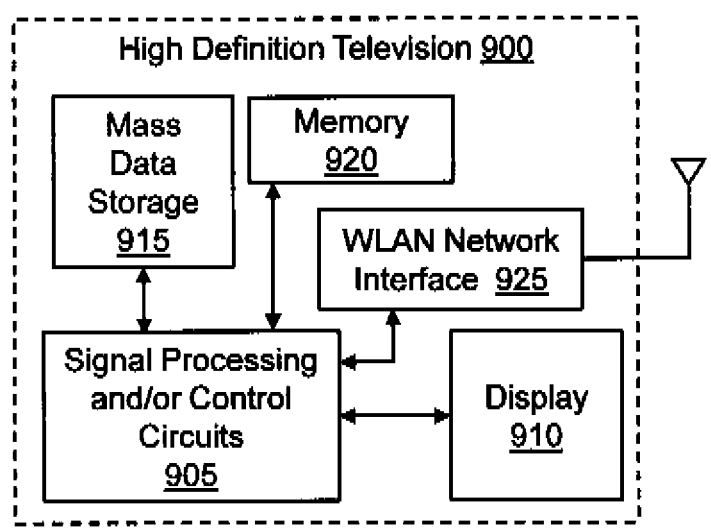

Referring now to FIG. 8C, some embodiments may be implemented in a high definition television (HDTV) 900. The example embodiment may implement signal processing and/or control circuits, which are generally identified in FIG. 8C at 905. The HDTV 900 receives HOW input signals in either a wired or wireless format and generates HDTV output signals for a display 910. In some implementations, the signal processing circuit and/or control circuit 905 and/or other circuits (not shown) of HDTV 900 may process data, perform coding and/or encryption, perform calculations, format data and/or perform any other type of HDTV processing that may be required. In this exemplary embodiment, the present invention may be implemented in this signal processing and/or control circuitry, but other arrangements are also possible.

The HDTV 900 may communicate with a mass data storage 915 that stores data in a nonvolatile manner by storing data in devices such as optical and/or magnetic storage devices. In some embodiments, the mass data storage 915 may be a hard disk drive (HDD). The HDD may be a mini HDD that includes one or more platters having a diameter that is smaller than approximately 1.8 inches. HDTV 900 may be connected to a memory 920 such as RAM, ROM, low latency nonvolatile memory such as flash memory and/or other suitable electronic data storage. HDTV 900 also may support connections with a wireless local area network (WLAN) via a WLAN network interface 925.

Figure 8D:
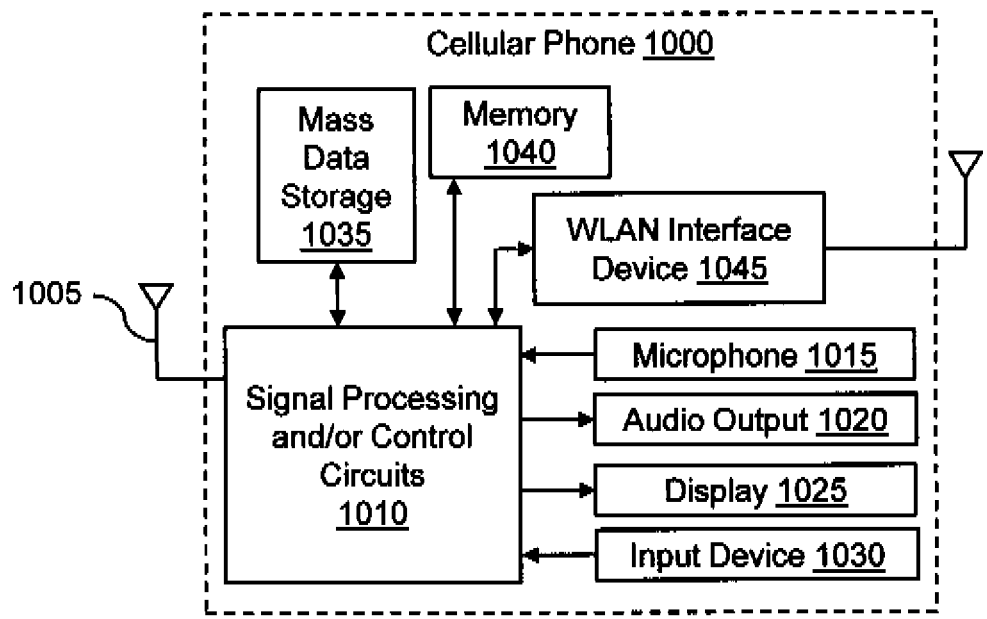

Referring now to FIG. 8D, some embodiments may be implemented in a cellular phone 1000 that may include a cellular antenna 1005. The example embodiment may implement signal processing and/or control circuits, which are generally identified in FIG. 8D at 1010. In some implementations, the cellular phone 1000 includes a microphone 1015, an audio output 1020 such as a speaker and/or audio output jack, a display 1025 and/or an input device 1030 such as a keypad, pointing device, voice actuation and/or other input devices. The signal processing and/or control circuits 1010 and/or other circuits (not shown) in the cellular phone 1000 may process data, perform coding and/or encryption, perform calculations, format data and/or perform other cellular phone functions. In this exemplary embodiment, the present invention may be implemented in this signal processing and/or control circuitry, but other arrangements are also possible.

The cellular phone 1000 may communicate with a mass data storage 1035 that stores data in a nonvolatile manner such as in optical and/or magnetic storage devices including, for example, HDDs and/or DVDs. The HDD may be a mini HDD that includes one or more platters having a diameter that is smaller than approximately 1.8 inches. The cellular phone 1000 may be connected to a memory 1040 such as RAM, ROM, low latency nonvolatile memory such as flash memory and/or other suitable electronic data storage. The cellular phone 1000 also may support connections with a WLAN via a WLAN network interface 1045.

Figure 8E:
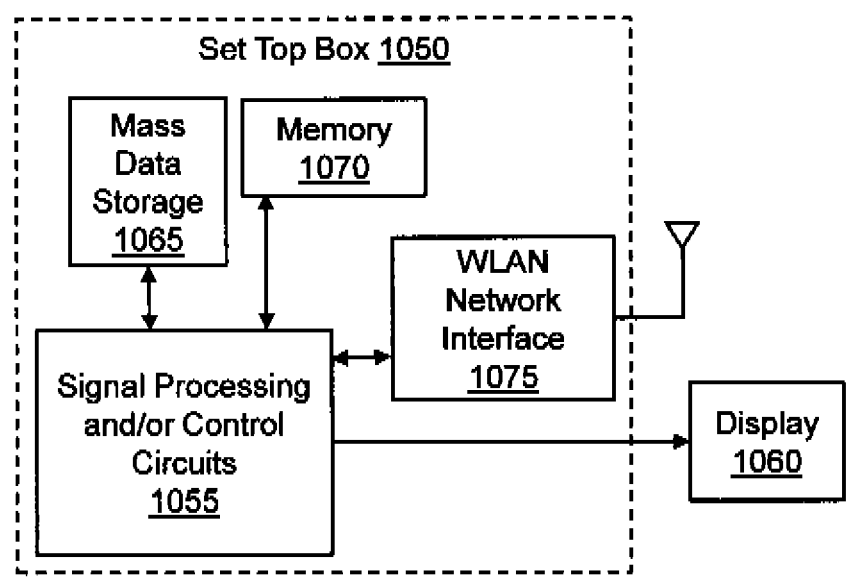

Referring now to FIG. 8E, some embodiments may be implemented in a set top box 1050. The example embodiment may implement signal processing and/or control circuits, which are generally identified in FIG. 8E at 1055. The set top box 1050 receives signals from a source such as a broadband source and outputs standard and/or high definition audio/video signals suitable for a display 1060 such as a television and/or monitor and/or other video and/or audio output devices. The signal processing and/or control circuits 1055 and/or other circuits (not shown) of the set top box 1050 may process data perform coding and/or encryption, perform calculations, format data and/or perform any other set top box function. In this exemplary embodiment, the present invention may be implemented in this signal processing and/or control circuitry, but other arrangements are also possible.

The set top box 1050 may communicate with a mass data storage 1065 that stores data in a nonvolatile manner. The mass data storage 1065 may include optical and/or magnetic storage devices including, for example, HDDs and/or DVDs. The HDD may be a mini HDD that includes one or more platters having a diameter that is smaller than approximately 1.8 inches. The set top box 1050 may be connected to a memory 1070 such as RAM, ROM, low latency nonvolatile memory such as flash memory and/or other suitable electronic data storage. The set top box 1050 also may support connections with a WLAN via a WLAN network interface 1075.

Figure 8F:
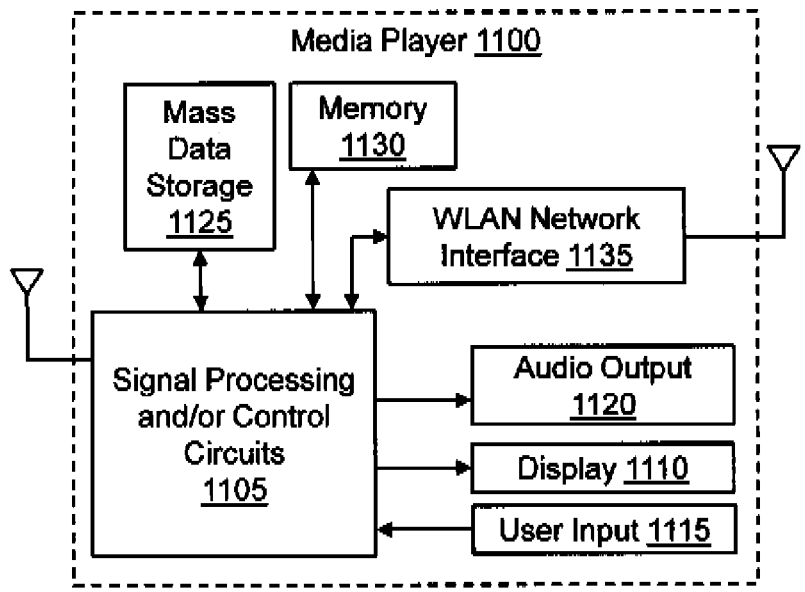
Figure 8G:
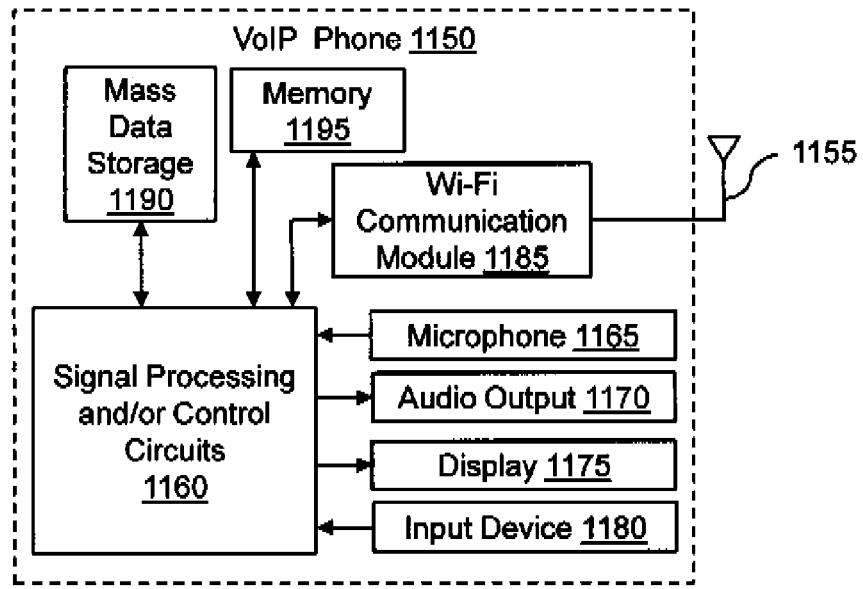

Referring now to FIG. 8F, some embodiments may be implemented in a media player 1100. The example embodiment may implement signal processing and/or control circuits, which are generally identified in FIG. 8F at 1105. In some implementations, the media player 1100 includes a display 1110 and/or a user input 1115 such as a keypad, touchpad and the like. In some implementations, the media player 1100 may employ a graphical user interface (GUI) that typically employs menus, drop down menus, icons and/or a point-and-click interface via the display 1110 and/or the user input 1115. The media player 1100 includes an audio output 1120 such as a speaker and/or audio output jack. The signal processing and/or control circuits 1105 and/or other circuits (not shown) of media player 1100 may process data, perform coding and/or encryption, perform calculations, format data and/or perform any other media player function. In this exemplary embodiment, the present invention may be implemented in this signal processing and/or control circuitry, but other arrangements are also possible.

The media player 1100 may communicate with a mass data storage 1125 that stores data such as compressed audio and/or video content in a nonvolatile manner. In some implementations, the compressed audio files include files that are compliant with the MP3 format or other suitable compressed audio and/or video formats. The mass data storage 1125 may include optical and/or magnetic storage devices, for example, HDDs and/or DVDs. The HDD may be a mini HDD that includes one or more platters having a diameter that is smaller than approximately 1.8 inches. The media player 1100 may be connected to a memory 1130 such as RAM, ROM, low latency nonvolatile memory such as flash memory and/or other suitable electronic data storage. The media player 1100 also may support connections with a WLAN via a WLAN network interface 1135. Still other implementations in addition to those described above are contemplated.

Referring to FIG. 8O, some embodiments may be implemented in a Voice over Internet Protocol (VoIP) phone 1150 that may include an antenna 1155. The example embodiment may implement signal processing and/or control circuits, which are generally identified in FIG. 8G at 1160. In some implementations, the VoIP phone 1150 includes, in part, a microphone 1165, an audio output 1170 such as a speaker and/or audio output jack, a display 1175, an input device 1180 such as a keypad, pointing device, voice actuation and/or other input devices, and a Wireless Fidelity (Wi-Fi) communication module 1185. The signal processing and/or control circuits 1160 and/or other circuits (not shown) in VoIP phone 1150 may process data, perform coding and/or encryption, perform calculations, format data and/or perform other VoIP phone functions. In this exemplary embodiment, the present invention may be implemented in this signal processing and/or control circuitry, but other arrangements are also possible.

The VoIP phone 1150 may communicate with a mass data storage 1190 that stores data in a nonvolatile manner such as optical and/or magnetic storage devices, for example HDDs and/or DVDs. The HDD may be a mini HDD that includes one or more platters having a diameter that is smaller than approximately 1.8 inches. The VoIP phone 1150 may be connected to a memory 1195, which may be a RAM, ROM, low latency nonvolatile memory such as flash memory and/or other suitable electronic data storage. The VoIP phone 1150 is configured to establish communications link with a VoIP network (not shown) via Wi-Fi communication module 1185.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A cache memory, comprising:
   a cache tag array comprised of a plurality of tag banks; and
   a bank selector configured to receive an address and to apply a hash function that maps the address to one of the plurality of tag banks, wherein the hash function is configured to non-uniformly distribute a memory address space to the plurality of tag banks, wherein the plurality of tag banks include a first tag bank and a second tag bank that are associated with memory banks that have a same access latency,
   wherein the hash function is configured to non-uniformly distribute the memory address space by allocating more addresses to the second tag bank than the first tag bank, and wherein addresses allocated to the first tag bank are accessed more frequently than addresses mapped to the second tag bank.

2. The cache memory of claim 1, wherein the bank selector over allocates addresses to the second tag bank by mapping more addresses of the memory address space to the second tag bank than a capacity of the second tag bank, and wherein the bank selector under-allocates addresses to the first tag bank, and wherein the bank selector is configured to under-allocate addresses to the first tag bank to ensure that accessing addresses mapped to the first tag bank does not result in a cache miss.

3. The cache memory of claim 1, wherein upon a number of cache memory accesses of a first address crossing a threshold value, the hash function is configured to map the first address to a first cache location that has no other memory addresses mapped to the first cache location.

4. The cache memory of claim 1, wherein the hash function is configured to map a first address accessing the cache memory more than a first number of times within a fixed time period to a first set of cache locations, and the hash function maps a second address that has not accessed the cache memory more than the first number of times within the fixed time period to a second set of cache locations.

5. The cache memory of claim 4, wherein the first and second sets of locations are different cache locations.

6. The cache memory of claim 1, wherein the bank selector is configured to reassign each memory address accessed more than a first number of times within a fixed time period to another cache location where only one address is assigned to the other cache location of each reassigned address.

7. The cache memory of claim 1, further including activity logic configured to monitor an access frequency for one or more addresses, wherein the bank selector is responsive to the activity logic to dynamically reassign addresses accessed above a threshold value to cache locations.

8. The cache memory of claim 7, wherein the threshold value is an access to the same memory address within a window of cache memory accesses.

9. The cache memory of claim 1, wherein the hash function is programmable.

10. The cache memory of claim 1, further including a hit logic configured to determine if one of the plurality of tag banks has valid data corresponding to the received address.

11. The cache memory of claim 1, wherein the plurality of tag banks includes a first tag bank and further including a fill logic configured to fill a cache line within the first tag bank upon determining that the first tag bank does not contain valid data corresponding to the received address.

12. The cache memory of claim 1, wherein the bank selector is configured to be dynamically reconfigurable.

13. The cache memory of claim 1, wherein the bank selector is operative to separate the received address into a tag field, an index field, and an offset field; wherein the bank selector is operative to use a portion of the tag field to map the address.

14. The cache memory of claim 13, wherein the bank selector is configured to map addresses using two bits from the tag field.

15. The cache memory of claim 1, wherein the bank selector is configured to map a physical address, a virtual address, or a segmented address.

16. The cache memory of claim 1, wherein the cache memory further includes a data array corresponding to the cache tag array.

17. The cache memory of claim 1, wherein the cache memory is a multi-way cache.

18. The cache memory of claim 1, wherein the cache memory is within a chip.

19. The cache memory of claim 1, wherein the cache memory is operably connected to a processor within a chip.

20. A method comprising:
mapping addresses of a memory to a plurality of banks of a cache memory, wherein the plurality of banks include a first bank and a second bank that are associated with memory banks that have a same access latency,
wherein a hash function is configured to non-uniformly distribute a memory address space of the memory by allocating more addresses to the second tag bank than the first tag bank, and wherein addresses allocated to the first tag bank are accessed more frequently than addresses mapped to the second tag bank;
receiving an address belonging to a memory address space;
selecting a bank by hashing the address with the hash function to determine to which bank of the plurality of banks within a cache memory the address is mapped, wherein the hash function maps the memory address space to the plurality of banks, and wherein the hash function maps the memory address space non-uniformly to the plurality of banks; and
accessing the bank selected by the hashing.

21. The method of claim 20, further including:
determining a rate of cache memory accesses for each of the one or more addresses requested from the cache memory;
determining whether each rate of cache memory accesses crosses a threshold amount; and
dynamically reassigning, each of the one or more addresses with an access amount that crosses the threshold amount to a different cache location.

22. The method of claim 20, further including:
determining an amount of accesses for high access address, where the high access address is mapped into a high density bank; and
dynamically reassigning the high access address to a low density bank with a lower density of addresses mapped to the low density bank than the high density bank to improve the cache memory hit rate, based on the amount of accesses of the high access address crossing a threshold amount.

23. The method of claim 20, further including dynamically reconfiguring the hash function.

24. The method of claim 20, wherein selecting a bank by hashing the address with the hash function over allocates addresses to the second bank by mapping more addresses of the memory address space to the second bank than a capacity of the second bank, and wherein the hash function under-allocates addresses from the memory address space to the first bank, and wherein under-allocating addresses to the first bank ensures that accessing addresses mapped to the first bank does not result in a cache miss.

25. The method of claim 20, further including accessing data pointed to by the received address and retrieving the data from the cache memory.

26. The method of claim 20, wherein the plurality of banks includes a first bank and a second bank, and wherein the hash function is configured to non-uniformly distribute the memory address space to the plurality of banks by allocating a first number of addresses to the first bank and a second number of addresses to the second bank that is greater than the first number of addresses.

27. The method of claim 20, further including filling a cache line within the determined bank with data corresponding to the received address, upon determining that the selected bank does not contain valid data corresponding to the received address.

28. A cache memory, comprising:
a cache tag array comprised of a plurality of tag banks; and
a bank selection logic including a hashing function configured to map addresses to the plurality of tag banks in a non-uniform distribution,
wherein the plurality of tag banks include a first tag bank and a second tag bank that are associated with memory banks that have a same access latency,
wherein the hashing function is configured to non-uniformly distribute the addresses by allocating more addresses to the second tag bank than the first tag bank, and wherein addresses allocated to the first tag bank are accessed more frequently than addresses mapped to the second tag bank.

29. The cache memory of claim 28, wherein the bank selection logic maps the addresses in the non-uniform distribution by mapping a different number of addresses to the first tag bank than the second tag bank, wherein the bank selection logic is configured to over allocate addresses to the second tag bank by mapping more addresses to the second tag bank than a capacity of the second tag bank, wherein the bank selection logic is configured to under-allocate addresses to the first tag bank, and wherein the bank selection logic is configured to under-allocate addresses to the first tag bank to ensure that accessing addresses mapped to the first tag bank does not result in a cache miss.

30. The cache memory of claim 28, wherein upon a number of cache memory accesses of a first address crossing a threshold value, the hashing function is configured to map the first address to a first cache location with no other memory addresses mapped to the first cache location.

31. The cache memory of claim 28, further including an activity logic configured to monitor cache memory access requests for each of the one or more addresses; wherein the bank selection logic reassigns a first address location when the access requests for the first address location crosses a threshold value to another cache location.

32. The cache memory of claim 31, wherein the threshold value is a function of a number of accesses to the same memory address.

33. The cache memory of claim 28, wherein the hash function is software programmable.

34. A chip comprising:
a cache comprising:
 a cache tag array comprised of a plurality of tag banks, wherein the plurality of tag banks include a first tag bank and a second tag bank that are associated with memory banks that have a same access latency;
 data array corresponding to the cache tag array; and
 a mapping logic including a hashing function configured to map addresses from an address space to the plurality of tag banks in a non-uniform distribution by allocating more addresses to the second tag bank than the first tag bank, wherein addresses allocated to the first tag bank are accessed more frequently than addresses allocated to the second tag bank; and
a processor operatively coupled to the cache.

* * * * *